US006136130A

United States Patent [19]

[11] Patent Number: 6,136,130
[45] Date of Patent: Oct. 24, 2000

Tataryan et al.

[54] HIGH STRENGTH, FLEXIBLE, FOLDABLE PRINTABLE SHEET TECHNIQUE

[75] Inventors: Anahit Tataryan, Temple City; Richard Mark Housewright, II, Glendora; William T. Evans, Seal Beach, all of Calif.; Susan C. Manfreda, Boston, Mass.

[73] Assignee: Avery Dennison Corporation, Diamond Bar, Calif.

[21] Appl. No.: 09/022,858

[22] Filed: Feb. 12, 1998

[51] Int. Cl.[7] ...................... B32B 31/00

[52] U.S. Cl. .................. 156/249; 156/252; 156/267; 156/277

[58] Field of Search .................. 156/226, 227, 156/249, 252, 253, 267, 277; 283/81, 106; 428/41.7, 41.8, 42.2, 42.3

[56] References Cited

U.S. PATENT DOCUMENTS

| | | | |
|---|---|---|---|
| 4,133,203 | 1/1979 | Walter . | |
| 4,784,317 | 11/1988 | Chen et al. . | |
| 5,002,626 | 3/1991 | Tezuka et al. | 156/252 |
| 5,198,275 | 3/1993 | Klein . | |
| 5,370,420 | 12/1994 | Khatib et al. . | |
| 5,389,414 | 2/1995 | Popat . | |
| 5,556,826 | 9/1996 | Perrington et al. . | |

OTHER PUBLICATIONS

Avery Kids Product letter, the Avery Kids Group, Avery Dennison Corporation, Aug. 1997.

*Primary Examiner*—Curtis Mayes
*Attorney, Agent, or Firm*—Oppenheimer Wolff & Donnelly LLP

[57] ABSTRACT

A high strength, flexible, foldable and printable sheet, such as a label sheet or cardstock, is provided with a line of weakness. The sheet has maximum dimensions greater than that of a box into which the sheet is to be located, and is therefore folded flat to fit into the box. The sheet is later removed, and may be printed in a laser or ink jet printer or copier. The sheet is formed to have a tensile strength of at least 4.5 or 5.0 or more kilograms, across the line of weakness, so that it will reliably feed through an office type printer or copier.

19 Claims, 2 Drawing Sheets

HIGH STRENGTH, FLEXIBLE, FOLDABLE PRINTABLE SHEET TECHNIQUE

This invention relates to printable sheets which are to be folded flat and, following extended storage, may be unfolded and reliably printed.

BACKGROUND OF THE INVENTION

Certain types of children's book, game, or toy products may include card stock or label sheets, such as 8½x11-inch sheets or A-4 size sheets which are stored in boxes for substantial periods of time, and then printed in a laser or ink jet printer. Typical size boxes for the children's products are 10¼x9x1¾ inches, or 9½x8x1½ inches, for specific examples; and they are often not large enough to take a normal 8½x11-inch (or A-4 size) card stock or label sheet, with the sheets lying flat.

Commercially available card stock and label sheets may be folded, and some label sheets even have perforations extending through both the face stock and the "liner" or release coated backing sheet. However, when conventional label sheets are folded to fit into boxes, such as those mentioned above, they may not have sufficient flexibility to easily be folded flat. Further, a number of conventional label sheets or card stock sheets may be included in children's products and firmly folded flat and compacted to fit into the box. In addition, they may be stored for long periods of time. Following this sequence of events, conventional sheets of these types may not have sufficient flexibility to be unfolded and then have sufficient strength to be reliably printed in a laser printer or an ink jet printer.

Thus, on the one hand, conventional label sheets with transverse perforations through both the face stock and the release coated backing may initially not easily fold as flat as would be desirable; and then if folded very flat and held flat for substantial periods of time, the label sheets may be creased or may tear at the perforation line, and therefore not reliably feed, as full sheets, through laser or ink jet printers.

SUMMARY OF THE INVENTION

One object of the present inventor is to provide a label sheet which may readily be folded extremely flat for extended periods of time, and which may subsequently be unfolded and reliably printed in an ink jet or laser printer. Another object of the invention is to provide a label sheet which may be reliably printed, and subsequently folded fully flat for inclusion in a product package.

In accordance with one illustrative example of the invention, the foregoing object may be achieved by the use of a label sheet assembly, including a face stock layer and a release coated backing or liner layer, with pressure-sensitive adhesive between the two layers, and with a fold line formed in the assembly along perforations in the liner, and with a narrow strip of the face stock being removed over the fold line.

A corresponding method includes the steps of folding one or more of the label sheet assemblies as described in the foregoing paragraph, folding them to place them in a b ox suitable for selling a product, including the sheet assembly or assemblies, and subsequently opening the boxes, unfolding the label sheets, and using a laser or ink jet printer to print on the unfolded label sheets.

In accordance with a further aspect of the invention, a label sheet assembly including a face stock layer and a release coated backing layer, with an intermediate layer of pressure-sensitive adhesive, may be provided with a high-strength, highly flexible fold line so that the laminated sheet may be readily folded fully flat but may be unfolded for easy feeding through a laser or ink jet printer before and/or after folding.

In the development of the invention, it was found that certain types of perforations would weaken the sheets of labels or card stock unduly, when the sheets were folded along the perforation lines, and then unfolded for printing. When the unduly weakened sheets were fed through a printer, the sheets would sometimes separate at the fold lines, or the label face stock would come loose from the release coated backing sheets, so as to jam the printer or copier.

To determine the degree of weakening, the inventors used an electromechanical tensile testing machine identified as an INSTRON 4301 tensile testing machine, available from Instron Company, 100 Royall Street, Canton, Mass. 02021. With the sheets being gripped on opposite sides of the line of weakness, the force required for separating the sheet along the line of weakness, is measured.

Using the tensile strength testing machine, various types of card stock and label sheet perforations were tested following folding and unfolding, and the results of the tests were related to the subsequent success and jamming of copier or laser or ink jet printer action with the sheets under consideration. One currently popular type of perforations is known as microperforations, using ties which are less than 0.01-inch in width. The cuts between the ties may range from about ⅛-inch to less than 0.01-inch. These microperforations formed a weakened line across a sheet which was greatly weakened by a fold along the perforations, so that the sheets required less than 1 or 2 kilograms of force for separation, and these weakened sheets did not print reliably following folding and unfolding.

Label sheets using a backing sheet or liner such as 50-pound release coated liner stock were also tested. When the designation "50-pound stock" is used, reference is made to the weight of 500 sheets of paper, 26 inches by 36 inches in size. The liner was made by Boise and coated by Rhinelander. The backing sheet was perforated using 1/16-inch cuts and 1/16-inch ties. A narrow strip of the label face stock extending over the perforations in the liner was removed. The liner was very flexible and could easily be folded flat in either direction. Following folding, the sheet had a strength of about 18.5 kilograms across the line of perforations. These label sheets reliably feed through copiers, laser printers, and ink jet printers following folding flat and subsequent unfolding.

Tests were also conducted using label sheets having specifications as set forth above, without removing a strip of face stock. In this case, the line of weakness involved perforations in which the cuts were 3/32-inch long and the ties were 1/32-inch in length, through both the face stock and the liner. Following folding and unfolding, the perforated sheet had a strength of about 5.2 kilograms to about 6.6 kilograms. Reliable printing and copying resulted, using this label stock.

Card stock referenced as 100-pound text stock was similarly perforated using 3/32-inch cuts and 1/32-inch ties, with similar tensile strength and favorable copying results, following folding and unfolding.

Tests were made using other sheet perforations. In general, in order to have reliable printing, the tensile strength along the weakened line was above 4.5 kilograms, and was preferably above 5.0 kilograms.

In accordance with a preferred method of the invention, therefore, sheets of label stock or card stock are perforated or otherwise weakened along a fold line to increase flexibility, but with adequate ties or residual sheet material to provide a tensile strength of at least 4.5 or 5.0 kilograms after folding flat and subsequent unfolding. The sheets are folded flat, placed in a box, and are subsequently printed with the sheets unfolded.

Accordingly, the sheets must have sufficient flexibility that they readily fold very flat, for inclusion in the boxes mentioned above and, following unfolding, have the levels of strength mentioned above.

The sheets may be card stock or label sheets, including face stock adhesive and release coated backing. Further, as noted above, a strip of the face stock may be removed along the fold line to increase flexibility.

Other objects, features and advantages of the invention will become apparent from a consideration of the following detailed description, and the accompanying figures.

DETAILED DESCRIPTION OF PREFERRED EMBODIMENTS

Figure 2:
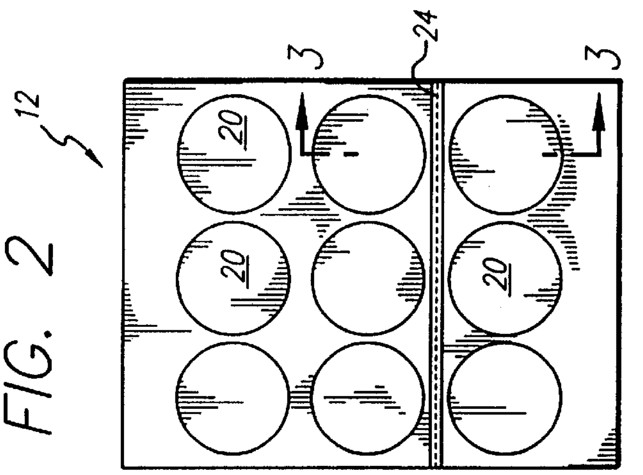
FIG. 2 is a top plan view of a laminated label sheet with a series of circular die-cut labels, and with a narrow strip having been removed at a fold line extending across the sheet.
Figure 1:
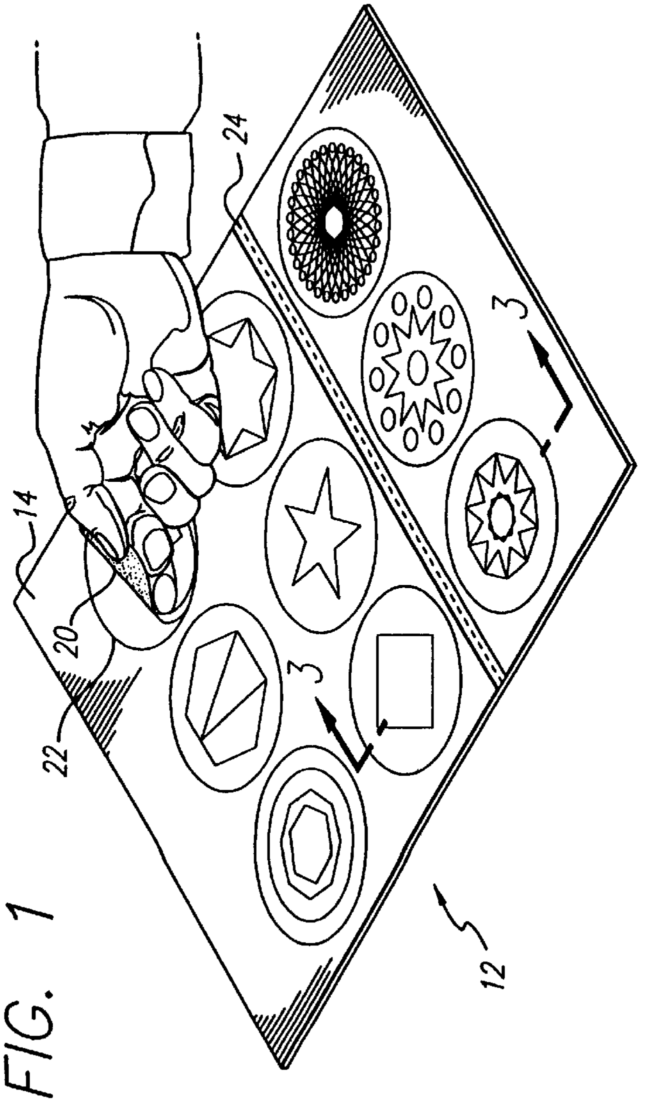
FIG. 1 is a diagrammatic showing of a label sheet, with one of the labels in the process of being removed from the sheet.
Figure 3:
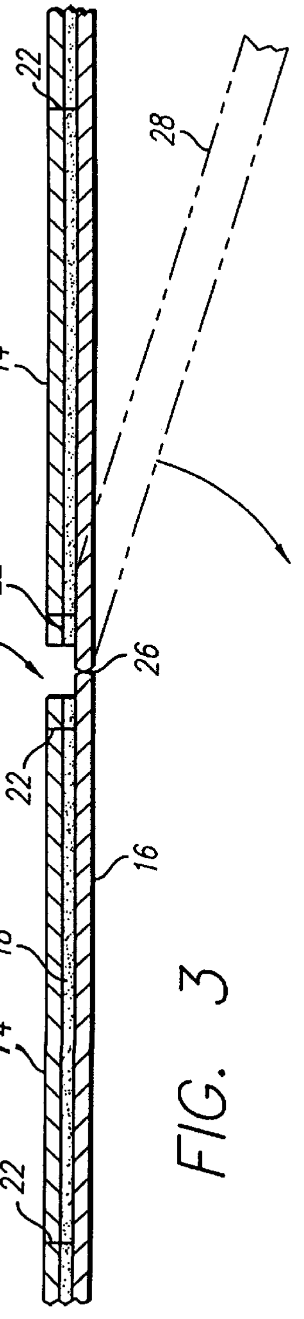
FIG. 3 is a partial cross-sectional view taken along lines 3—3 of FIG. 2.

Referring more particularly to the figures, FIGS. 1–3 show a label sheet 12 including a top face stock sheet 14, and a bottom release coated backing sheet 16. As best shown in FIG. 3, a layer of pressure-sensitive adhesive 18 is provided between the face stock 14 and the release coated backing 16. In FIG. 1, one of the pressure-sensitive labels 20 is shown being removed from the laminated sheet 12. In FIG. 1, the circular line 22 represents the die cut through the face stock, but not through the release-coated backing sheet. Incidentally, the backing sheet 16 is normally coated with a thin release layer of a material such as silicone, so that upon removal of the label, as shown in FIG. 1, the pressure-sensitive adhesive 18 will adhere to the label, and will release from the backing sheet.

FIG. 2 is a top plan view of the sheet 12 showing the die cut labels 20. Also shown in all of FIGS. 1, 2 and 3 is the line of weakness 24 which permits folding of the label sheet to more easily fit into a box having maximum dimensions which are less than the size of the sheet. As shown in FIGS. 1, 2, and 3, the line of weakness includes perforations 26 which extend through the release-coated backing sheet 16, and also involves the removal of a strip of the face stock 14 extending across the sheet so as to permit easier folding about the line of perforations 26 in the backing sheet. The dash dot lines 28 in FIG. 3 indicates the relative ease with which the two portions of the sheet 12 may be bent about the line of weakness 24. Also shown in FIG. 3 are the die cut lines 22 extending through the face stock, but not through the release coated backing sheet. Incidentally, in the cross-sectioned views, the thickness of the layers is exaggerated in order to bring out more clearly the details of the constructions.

Figure 4:
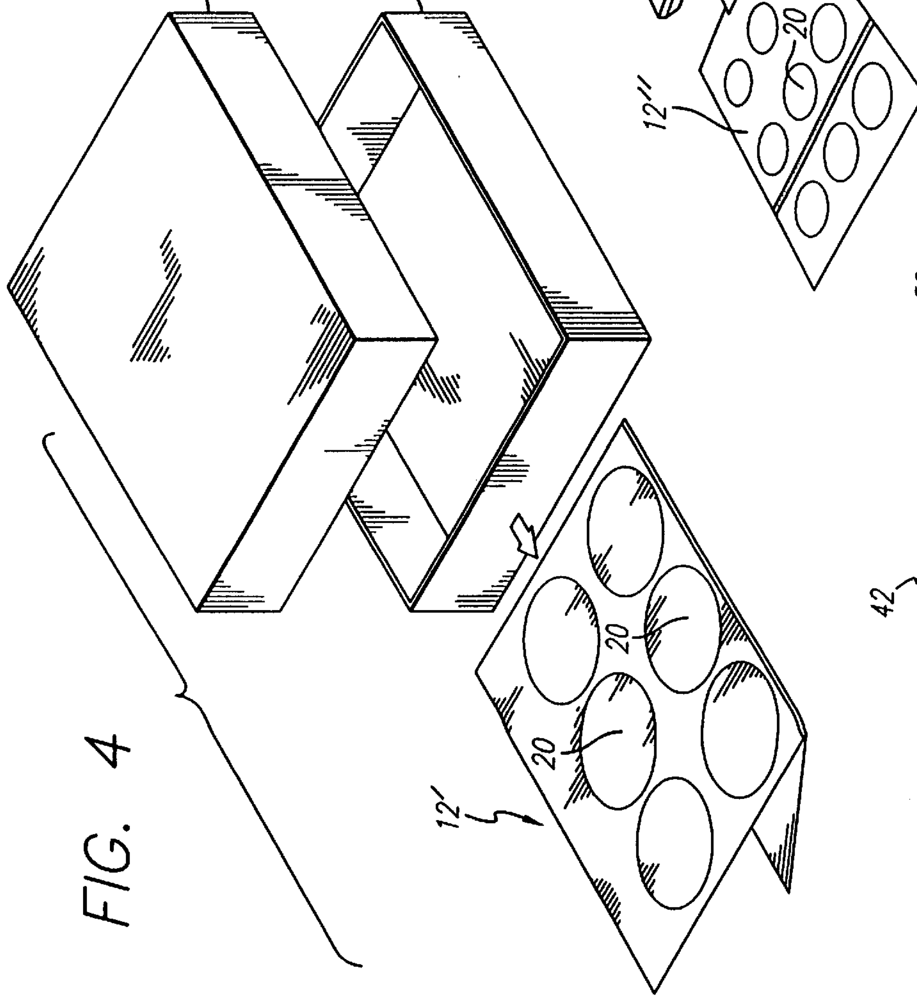
FIG. 4 indicates schematically the removal of a label sheet which has been folded, from a box.

Referring now to FIG. 4, a label sheet 12' is shown having been removed from the box which includes the main box portion 34 and the lid 36. As mentioned above, typical size boxes for children's products are 10¼"×9"×1¾", or 9½"×8"×1½", for specific examples. Of course, with normal label sheets being 8½ inches×11 inches in size, they must be folded in order to fit flat in the box 34, 36. Similarly, A4 paper, which is nearly the same size as the 8½"×11" size sheets, will not fit within the boxes under consideration, without folding.

Figure 5:
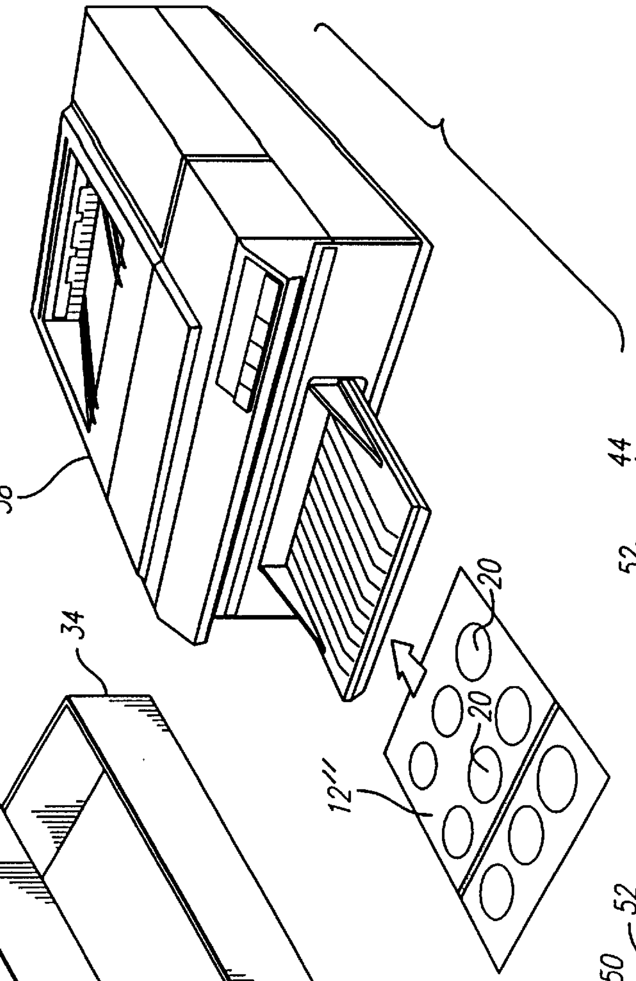
FIG. 5 shows a printer through which the unfolded label sheet of FIG. 4 is fed in order to be printed.

Several of the label sheets, such as label sheet 12, are folded very flat and included in boxes such as the box 34, 36, along with other items making up a game or toy package. Following removal of the label sheets, they may be fed through a printer or copier such as that shown at reference numeral 38 in FIG. 5, with the label sheet 12" being ready for insertion into the printer or copier.

Figure 6:
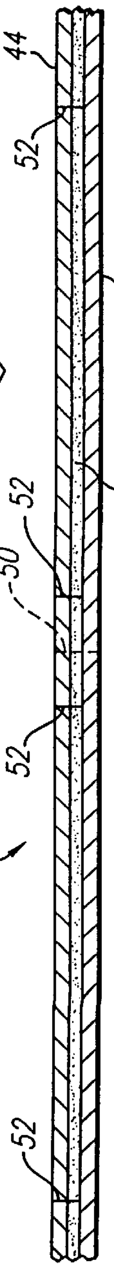
FIG. 6 is a cross-sectional view of an alternative embodiment of the invention.

FIG. 6 is a partial cross-sectional view of an alternative label sheet 42 including a face stock sheet 44 and a release coated backing sheet 46 separated by pressure-sensitive adhesive layer 48. The weakened fold line for the sheet 42 is accomplished by a line of perforations 50 which extend across the sheet in a manner similar to the line of weakness 24 in FIG. 2. However, in the embodiment of FIG. 6, both the face stock and the release-coated backing sheet are perforated together, and no strip of the face stock is removed, as in the showing of FIGS. 1 through 3. It may also be noted that the die cuts 52, as shown in FIG. 6, permit the ready separation of labels from the backing sheet. The perforations 50 may involve 3/32 inch cuts and 1/32 inch ties, as mentioned above, or other combinations of cuts and ties, providing sufficient flexibility so that the sheets may be folded fully flat, and then have at least 4.5 to 5 or more kilograms of strength, so that they will reliably feed through a copier or printer.

In the foregoing specification, certain specific embodiments of the invention, and certain specific constructions have been disclosed relative to the size and construction of the laminated label sheets, and the nature of the line of weakness. It is to be understood that variations in the type of sheets which may be used, and in the nature of the lines of weakness, are contemplated. Thus, in addition to the specific dimensions and the size of the cuts and ties for perforations, other combinations of cuts and ties, or other weakening configurations which provide the necessary flexibility and strength as disclosed herein may be employed. Thus, for example, but not of limitation, instead of perforations, the sheets may be die cut partially through the thickness of the sheets to provide the same flexibility and strength parameters as discussed hereinabove. Also, sheets 8½ inches by 14 inches may be used; and, more generally, any sheet material having a maximum dimension greater than that of the box or container for the sheets, may be used. Accordingly, the present invention is not limited to the specific embodiments and dimensions disclosed hereinabove.

What is claimed is:

1. A method comprising the steps of:

preparing a label sheet assembly having a width of approximately 8½ inches, and a length of approximately 11 inches, said label sheet assembly including label face stock, pressure-sensitive adhesive and a release-coated backing sheet, said sheet being provided with a high-strength, high-flexibility fold line extending across the width of said sheet assembly; said fold line including perforations in said backing sheet having substantially equal length cuts and ties, and said face stock having a narrow strip encompassing said fold line removed from said assembly;

folding said label sheet assembly along said fold line;

placing said sheet assembly in a box having a maximum dimension less than 11 inches;

removing said folded label sheet assembly from said box; and printing onto said sheet in an ink jet printer or a laser printer.

2. A method as defined in claim 1 including the further step of applying printed labels to additional material provided in said box.

3. A method as defined in claim 1 wherein the sheet is prepared so as to have a tensile strength across the perforated fold line of at least 4.5 kilograms.

4. A method comprising the steps of:

preparing a printable sheet having a width of approximately 8½ inches, and a length of approximately 11 inches, said sheet being provided with a weakened high-strength, high-flexibility fold line extending across the width of said sheet assembly; said sheet having a tensile strength across said weakened fold line following folding and unfolding of at least 4.5 kilograms; said weakened fold line providing sufficient flexibility to permit folding said sheet flat along said fold line;

folding said sheet along said fold line;

placing said folded sheet in a box having a maximum dimension less than 11 inches;

removing said sheet from said box; and printing onto said sheet in an ink jet printer or a laser printer.

5. A method as defined in claim 4 wherein said printable sheet is prepared as a label sheet having face stock, a release coated backing sheet, and a layer of pressure-sensitive adhesive between the face stock and the backing sheet.

6. A method as defined in claim 5 wherein said sheet is prepared by including the step of removing a strip of said face stock along said fold line.

7. A method comprising the steps of:

preparing a label sheet assembly having a predetermined width and a predetermined length, said label sheet assembly including label face stock, pressure-sensitive adhesive and a release-coated backing sheet; said sheet being provided with a high-strength, high-flexibility fold line extending across the width of said sheet assembly; said fold line including perforations in said backing sheet having substantially equal length cuts and ties, and said face stock having a narrow strip encompassing said fold line removed from said assembly;

folding said label sheet assembly along said fold line;

placing said folded label sheet assembly in a box having a maximum dimension less than said predetermined length;

removing said label sheet assembly from said box; and printing onto said sheet in an ink jet printer or a laser printer.

8. A method as defined in claim 7 including the further step of applying printed labels to additional material provided in said box.

9. A method as defined in claim 7 wherein the sheet is prepared so as to have a tensile strength across the perforated fold line of at least 4.5 kilograms.

10. A method comprising the steps of:

preparing a printable sheet having a predetermined width and a predetermined length, said sheet being provided with a weakened high-strength, high-flexibility fold line extending across the width of said sheet assembly; said sheet having a tensile strength across said weakened fold line following folding substantially flat and unfolding, of at least 4.5 kilograms; said weakened fold line providing sufficient flexibility to permit folding said sheet flat along said fold line;

folding said sheet along said fold line;

placing said folded sheet in a box having a maximum dimension less than said predetermined length;

removing said sheet from said box; and printing onto said sheet in an ink jet printer or a laser printer.

11. A method as defined in claim 4 wherein said printable sheet is a label sheet having face stock, a release coated backing sheet; and an intermediate layer of pressure-sensitive adhesive.

12. A method as defined in claim 11 wherein said sheet is prepared by including the step of removing a strip of said face stock along said fold line.

13. A method as defined in claim 11 wherein said method includes preparing the sheet approximately 11 inches in length.

14. A method comprising the steps of:

preparing a printable sheet having a predetermined width and a predetermined length, said sheet being provided with a weakened high-strength, high-flexibility fold line extending across the width of said sheet assembly; said sheet having a tensile strength across said weakened fold line following folding and unfolding of at least 4.5 kilograms; said weakened fold line providing sufficient flexibility to permit folding said sheet flat along said fold line;

folding said sheet along said fold line;

placing said folded sheet in a box having a maximum dimension less than said predetermined length;

removing said sheet from said box; and manipulating said sheet without separating the sheet along said lines of weakness.

15. A method as defined in claim 14 wherein said printable sheet is prepared as a label sheet having face stock, pressure-sensitive adhesive and a release coated backing sheet.

16. A method as defined in claim 15 wherein said sheet is prepared by including the step of removing a strip of said face stock along said fold line.

17. A method as defined in claim 14 including the step of printing on said sheet following removal from the box and unfolding.

18. A method as defined in claim 14 including the step of printing on said sheet before placing the sheet in said box.

19. A method as defined in claim 14 wherein said preparing step includes forming said fold line to have a strength across said fold line of at least 5.0 kilograms.

* * * * *